Oct. 6, 1931.  W. A. TROTH  1,826,032

KITCHEN UTENSIL

Filed July 19, 1929

Inventor:
Walter A. Troth.

By F. V. Winters.
Attorney

Patented Oct. 6, 1931

1,826,032

UNITED STATES PATENT OFFICE

WALTER A. TROTH, OF BROOKLYN, NEW YORK

KITCHEN UTENSIL

Application filed July 19, 1929. Serial No. 379,544.

This invention relates to kitchen utensils and the improvements are directed to a novel form of container wherein substances having different specific gravities may be separated.

After the process of cooking meats, or the like, has been completed and the material has been removed from the stove or other cooking means, a considerable quantity of liquid is found in the bottom of the cooking utensils, said liquid containing extracts of the meat and being valuable in that appetizing gravies may be made therefrom. In view of the fact that said liquid contains a quantity of grease and water, it becomes necessary to provide means whereby the desirable portions of said liquid may be separated.

It is therefor the primary object of the present invention to provide a container wherein the extracted liquid operated in a manner to divide out the extraneous matter in said liquid.

Another object is to provide an article of the above-mentioned character whereby the separated portions of the extracted liquid may be readily discharged from said article.

A still further object of the invention is to provide means whereby the article may be conveniently handled without danger of burning the fingers or disrupting the separated portions of the liquid.

Still a further object is to provide an article which may be inexpensively manufactured and which will become a valuable adjunct to the usual collection of kitchen utensils.

With these objects in view, together with others which will appear as the description proceeds, the invention resides in the novel formation, combination, and arrangement of parts, all as will be described more fully hereinafter, illustrated in the drawings, and particularly pointed out in the claims.

As hereinbefore pointed out it is proposed to provide a kitchen utensil, termed a separator, which is adapted to receive the extracted liquid usually formed in the bottoms of cooking utensils, such as frying-pans, pressure cookers and ordinary boilers. Heretofore, this liquid has been allowed to cool in the cooking utensil and the formed grease which congealed into a cake, finally removed and the liquid contents poured off. Since this mode of procedure requires that the usual cleansing operation of the cooking utensils be deferred to some later time and since the relative quantity of the liquid in the utensil hardly requires that said liquid remain therein, I propose to provide a separate vessel wherein the liquid may be poured and separated as will appear hereinafter.

Figure 1:
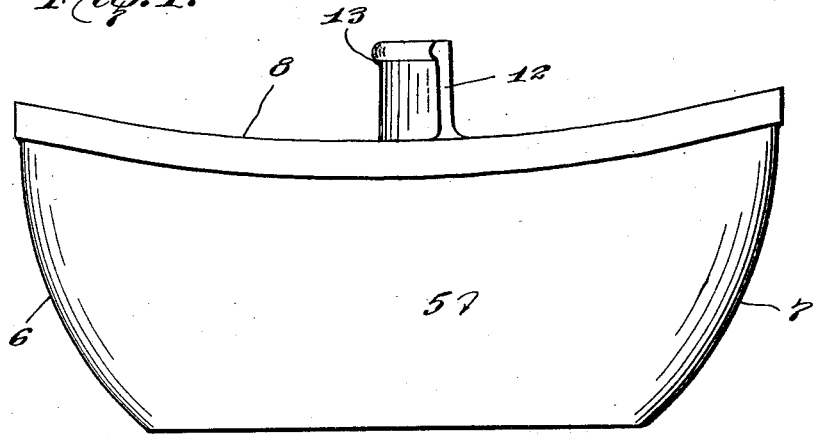
Figure 1 is a side elevation of my improved kitchen utensil.
Figure 2:
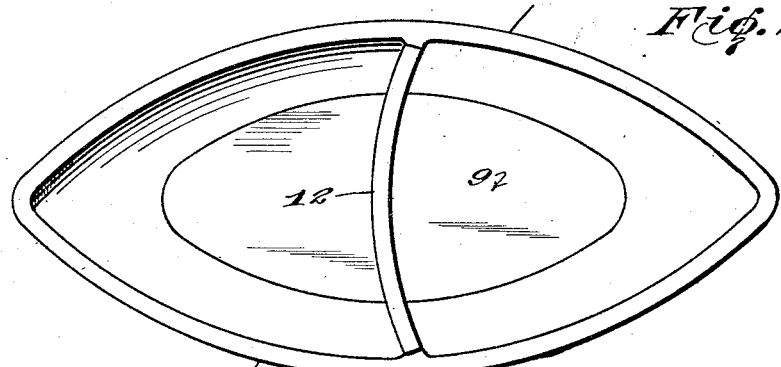
Fig. 2 is a plan view thereof.
Figure 3:
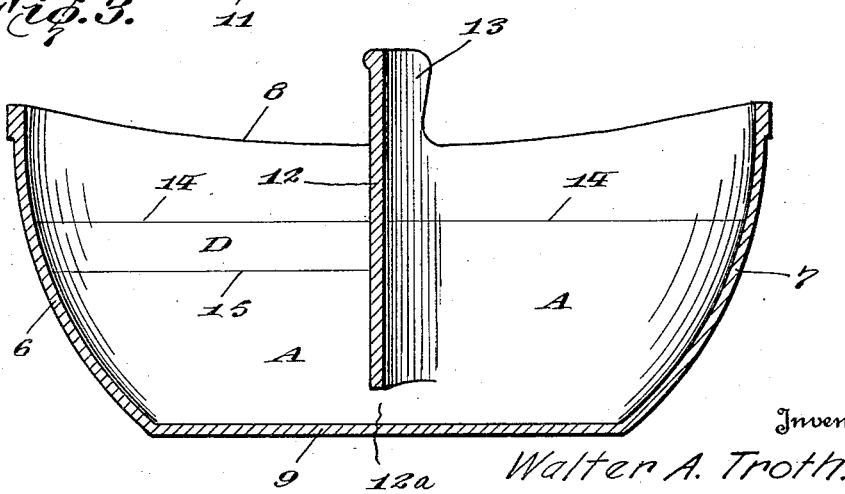
Fig. 3 is a central vertical longitudinal section to illustrate the relation of a certain partition to the base of the article.

Therefore, referring now more in particular to the accompanying drawings, wherein like characters of reference denote similar parts throughout the several views, let 5 indicate generally my improved utensil, which is provided with curved ends 6 and 7 and an open top having its margins preferably concaved, as indicated at 8. Said utensil is further provided with a flat bottom 9, from which the sides 10 and 11 rise with a gentle curvature, as clearly shown in Fig. 3. The curved ends 6 and 7 blend with the curvature of said sides 10 and 11 to form snouts which facilitate the pouring of liquids from the utensil. As shown in Figs. 2 and 3, said utensil is provided with a partition 12, arcuately disposed, and having its lower portion spaced from the bottom 9 to provide a space 12a, while the upper portion of said partition is extended above the top edges of the sides 10 and 11 to form a convenient hand-hold 13 to render the handling of the article more facile.

In using the article, the liquid contents from a cooking utensil is poured into the compartment to the right of said partition 12 whereupon the combined components of said liquid contents, to wit; gravy and water will pass through said space 12a, plus a very small percentage of grease; thus, the gravy is present and distinct unto itself, and the grease remains distinct unto itself, so that an abundance of grease is absent from the gravy, yet the said grease in such proportions as desired, may be added to said gravy by a slight tipping of the separator in a proper direction, or by dipping same by spoon from the grease compartment and depositing said grease into the gravy compartment, thus affording an opportunity for the satisfaction of palatable desires.

In Fig. 3, assuming the level of the contents to be at the line 14, the grease will congeal approximately in the region D, between lines 14 and 15. After said grease has congealed, it may be removed and the remaining liquid poured from the utensil in the form of a dark gravy, which may be re-heated for use.

In view of the converging ends, as aforesaid, the restriction provided facilitates the pouring of the liquid, and in view of the extension of the partition or baffle above the sides of the article a convenient hand-hold is provided when it is desired to lift same for pouring or other purposes. The arcuate disposition of the partition affords a greater area for the pure grease gravy, and in view of the arrangement of said partition at the medial portion of the article, a true balance is maintained when transferring its hot contents from one place to another.

While the present is a disclosure of the preferred embodiment of the invention, it is to be understood that the invention is not limited thereto, as various changes in the minor details of construction, proportion and arrangement of parts may be resorted to without departing from the spirit of the invention, as defined in the appended claims.

I claim:

1. A kitchen utensil comprising a body portion presenting converging ends serving as snouts to facilitate the pouring of liquids therefrom and a partition arcuately disposed within the said body portion, said partition extending above the sides being spaced from the bottom of said body portion and being adapted to permit the passage of a liquid from one side of said partition to the other.

2. A kitchen utensil comprising a body portion presenting converging ends serving as snouts to facilitate the pouring of liquids therefrom, and an arcuately disposed partition arranged at the medial portion of said utensil, said partition being spaced from the bottom of said body portion to permit passage of liquid from one side thereof to the other, the upper portion of said medial partition being extended above the sides of the utensil to afford a hand-hold whereby a true balance is maintained when transferring said utensil and contents from place to place.

In testimony whereof I affix my signature.

WALTER A. TROTH.